United States Patent [19]

Matsushita et al.

[11] Patent Number: 5,129,740
[45] Date of Patent: Jul. 14, 1992

[54] BEARING DEVICE FOR MINIATURE MOTORS AND METHOD OF MAKING SAME

[75] Inventors: Ikuo Matsushita; Michio Hoshino, both of Matsudo, Japan

[73] Assignee: Mabuchi Motor Co., Ltd., Chiba, Japan

[21] Appl. No.: 650,741

[22] Filed: Feb. 5, 1991

[30] Foreign Application Priority Data

Feb. 7, 1990 [JP] Japan .................................. 2-27410

[51] Int. Cl.$^5$ ............................................. F16C 35/02
[52] U.S. Cl. .................................... 384/441; 384/204; 384/439; 384/537
[58] Field of Search .............. 384/441, 204, 192, 439, 384/428, 537

[56] References Cited

U.S. PATENT DOCUMENTS

| | | | |
|---|---|---|---|
| 3,382,015 | 5/1968 | Steidl | 384/441 |
| 4,688,952 | 8/1987 | Setele | 384/537 |
| 4,784,499 | 11/1988 | Fukute | 384/441 |
| 4,806,028 | 2/1989 | Miller et al. | 384/537 |

Primary Examiner—Lenard A. Footland
Attorney, Agent, or Firm—McGlew & Tuttle

[57] ABSTRACT

A bearing device for miniature motors having a cylindrically-shaped bearing support formed by pressing an end face of a metallic motor case, and a bearing press-fitted into the bearing support to rotatably support a motor shaft, characterized in that a pressed groove is formed on the outer circumferential surface of the bearing support by pressing the outer circumferential surface is disclosed. A method of making a bearing device for miniature motor in which the clearance between the bearing and the motor shaft is set by pressing the outer circumferential surface of the bearing support using a pressing jig in a state where the motor shaft is inserted into the bearing is disclosed. Furthermore, a method of making a bearing device for miniature motors in which the pressing jig consists of at least two fixed rollers adapted to rotatably make contact with the outer circumferential surface of the bearing support, and a movable roller adapted to be rotatably forced onto the outer circumferential surface of the bearing support.

3 Claims, 2 Drawing Sheets

BEARING DEVICE FOR MINIATURE MOTORS AND METHOD OF MAKING SAME

BACKGROUND OF THE INVENTION

This invention relates generally to a bearing device for miniature motors and a method of making the same to fit a motor shaft to the bearing device, and more particularly to a bearing device for miniature motors in which noise generated by motor revolution is reduced by forcibly reducing the clearance between the bearing and the motor shaft by pressing the outer circumferential surface of the bearing support using a pressing jig, and a method of making the same.

DESCRIPTION OF THE PRIOR ART

FIG. 4 illustrates an example of a miniature motor of a conventional type, having essentially the same construction as ordinary miniature motors. In FIG. 4, electric current is supplied to a rotor winding 14 wound on a rotor core 13 fixedly fitted to a motor shaft 5 via terminals 9 supported by a small case 8, brushes 11 which make contact with a commutator 10, and the commutator 10 fixedly fitted to a motor shaft 5 supported by bearing 4 and 12. As a result, a rotor 16 having the rotor winding 14 to which current is fed is placed in a magnetic field formed by a permanent magnet 15 fixedly fitted to the inner circumferential surface of a motor case 1, and thereby the miniature motor is caused to rotate.

The tolerance permitted in machining the bearing 4 and the motor shaft 5 with machine tools is approximately 5 μm. Consequently, the accuracy of the inside diameter of the bearing 4 as a finished part is the inside diameter $\phi+1$ to 6 μm. And, the accuracy of the diameter of the motor shaft 5 is the diameter $\phi'-1$ to 6 μm.

Thus, the clearance between the bearing and the motor shaft in a bearing device in a conventional type of miniature motor is 12 μm at the maximum.

If the clearance between the motor shaft and the motor bearing is large, mechanical vibration is caused during motor revolution. And, the larger mechanical vibration is, the higher becomes mechanical noise.

In order to reduce mechanical noise, therefore, the aforementioned clearance must be reduced.

As described above, however, the clearance between the bearing and the motor shaft in a bearing device in a conventional type of miniature motor inevitably becomes 12 μm at the maximum, posing an unwanted problem of increased mechanical noise.

The above problem can of course be solved by machining the bearing and the motor shaft by a highly skilled operator using a machine tool having a high machining accuracy. This, however, would result in another unwanted problem of high machining cost.

SUMMARY OF THE INVENTION

This invention is intended to overcome the above-mentioned problems. It is an object of this invention to provide a bearing device for miniature motors and a method of making the same in which mechanical vibration caused by the clearance between the clearance between the bearing and the motor shaft, and at the same time, mechanical noise caused during motor revolution is reduced.

That is, the bearing device for miniature motor according to this invention has a pressed groove produced on the outer circumferential surface of the bearing support by pressing the outer circumferential surface.

In the method of making the bearing device of miniature motors of this invention, the clearance between the bearing and the motor shaft is set by pressing the outer circumferential surface of the bearing support using a pressing jig. Furthermore, in the method of making the bearing device for miniature motors of this invention, the pressing jig consists of at least two fixed rollers adapted to rotatably make contact with the outer circumferential surface of the bearing support and a movable roller adapted to be rotatably forced onto the outer circumferential surface of the bearing support.

These and other objects and advantages of this invention will become more apparent by referring to the following description and FIGS. 1 and 3.

DETAILED DESCRIPTION OF THE EMBODIMENT

Figure 1A:
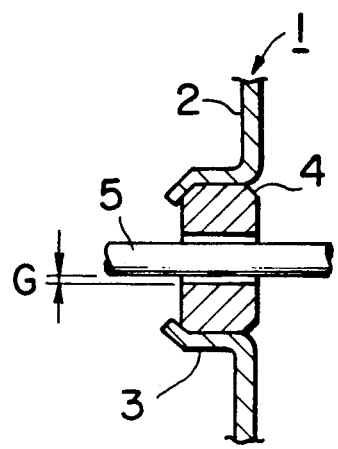
FIGS. 1 (A) and 1 (B) are diagrams of assistance in explaining the principle of this invention.
Figure 1B:
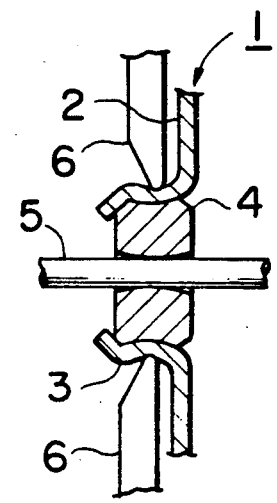

FIGS. 1 (A) and 1 (B) are diagrams of assistance in explaining the principle of this invention; FIG. 1 (A) being a crosssectional view of a bearing device of miniature motors on which this invention is based, and FIG. 1 (B) a diagram illustrating the state where the bearing device of this invention is mounted. In FIG. 1, numeral 1 refers to a motor case; 2 to an end face of the motor case 1; 3 to a bearing support; 4 to a bearing; 5 to a motor shaft; and 6 to a pressing jig, respectively. The miniature motor having such a construction revolves in accordance with the same operating principle as that of the conventional miniature motor.

Figure 4:
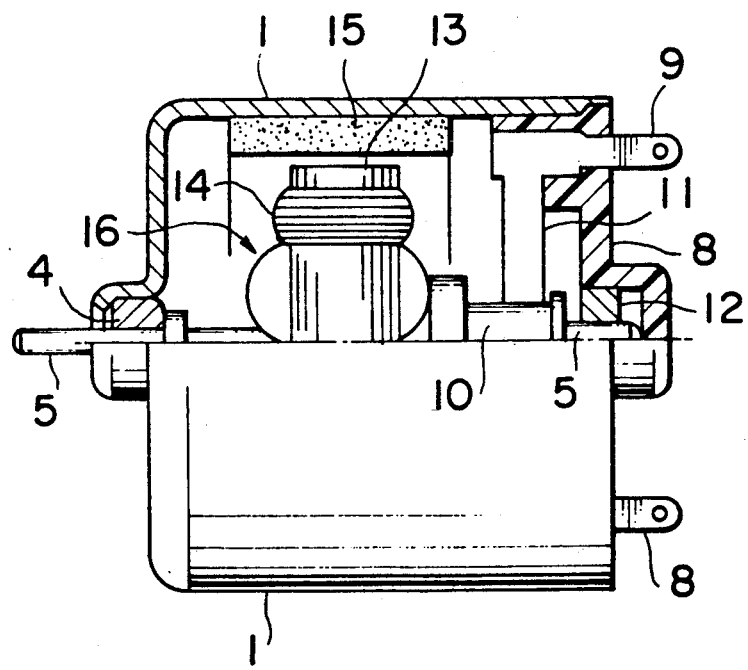
FIG. 4 illustrates a general construction of a miniature motor to which this invention is applied.

The bearing device of a miniature motor on which this invention is based, that is, the bearing device in the assembled state of a miniature motor, as shown in FIG. 4, has a relatively large clearance G, of 12 μm, for example, between the bearing 4 and the motor shaft 5 due to limitation is machining accuracy, as shown in FIG. 1 (A).

In this invention, the pressing jig 6 is pressed against the entire outer circumferential surface of the bearing support 3 in the direction of the motor shaft 5 by a pressing device (not shown), as shown in FIG. 1 (B). The pressing force exerted by the pressing jig 6 can forcibly reduce the clearance G. In the pressing process by the pressing jig 6, as the outer circumferential surface of the bearing 4 is pressed by the pressing jig 6 until the inner circumferential surface of the bearing 4 comes in contact with the motor shaft 5 and the removed from the pressing jig 6, as shown in FIG. 1 (B), the clearance (not shown) between the bearing 4 and the motor shaft 5 becomes minimal due to the restoring force of the bearing 4.

Figure 3:
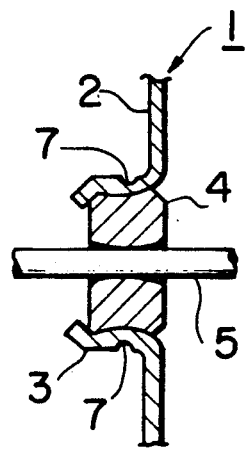
FIG. 3 is a diagram of assistance in explaining a bearing device embodying this invention.

The bearing device for miniature motors according to this invention, after subjected to the pressing process, has a pressed groove 7 (as shown in FIG. 3) formed as a pressing mark on the outer circumferential surface of the bearing support 3. The pressed groove 7 may be a relatively sharp and deep groove or a shallow groove, or may take any other shapes. Though not shown, the drive unit for pressing the pressing jig 6 should preferably be of a type that can adjust pressing force.

As described above, the clearance between the bearing 4 and the motor shaft 5 can be reduced merely by adding a process of pressing the entire outer circumferential surface of the bearing support 3 after the bearing 4 is inserted into the bearing support 3. That is, this invention makes it possible to reduce the clearance between the bearing and the motor shaft merely by adding the aforementioned pressing process without changing the conventional manufacturing method, and as a result, reduce mechanical noise. Furthermore, by simultaneously performing the process of fixedly fitting the bearing 4 and the bearing support 3 by bending an end of the bearing support 3 and the process of forming the pressed groove, using the pressing jig 6, the conventional manufacturing process need not be changed merely changing the shape of the pressing jig 6.

Figure 2:
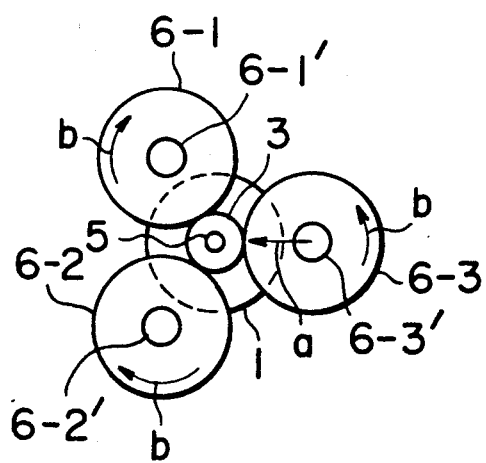
FIG. 2 is a diagram of assistance in explaining a method of making a bearing device for miniature motors embodying this invention.

FIG. 2 is a diagram of assistance in explaining the pressing jig in an embodiment of the manufacturing method embodying this invention. FIG. 3 shows the bearing 4 and the pressed groove 7 formed by the pressing jig 6 shown in FIG. 2. Reference numeral 6-1 and 6-2 in the figure refer to fixed pressing rollers; 6-1' and 6-2' to fixed roller shafts; 6-3 to a movable pressing roller; 6-3' to a movable roller shaft; and 7 to a pressed groove. Other numerals correspond to like numerals shown in FIG. 1. In FIG. 2, the fixed pressing rollers 6-1 and 6-2, and the movable pressing roller 6-3 are rotatably fitted to the fixed roller shafts 6-1' and 6-2', and to the movable roller shaft 6-3', respectively. The fixed roller shafts 6-1' and 6-2' are fitted in such a fashion as to be rotated around themselves, without moving the relative positions thereof. The movable roller shaft 6-3', on the other hand, is adapted to be movable in the direction shown by arrow a by a drive unit via a screw shaft (not shown) or hydraulically while maintaining the rotatable state. The shape of the outer peripheral shape of the fixed pressing rollers 6-1 and 6-2 and the movable pressing roller 6-3 is the same as that of the pressing jig 6 shown in FIG. 1 (B), for example.

The manufacturing method shown in FIG. 2 is designed to reduce the clearance G between the bearing 4 and the motor shaft 5 by forcibly pressing the outer circumferential surface of the bearing support 3 with the fixed pressing rollers 6-1 and 6-2 and the movable pressing roller 6-3. That is, a bearing device having a smaller clearance G is formed by bringing the outer circumferential surface of the bearing support 3 of a miniature motor shown in FIG. 1 (A) into contact with each of the fixed pressing rollers 6-1 and 6-2 and the movable pressing rollers 6-3, and forcing the movable pressing roller 6-3 onto the outer circumferential surface of the bearing surface 3 in the direction shown by arrow a while rotating the fixed pressing rollers 6-1 and 6-2 and the movable pressing roller 6-3 in the direction shown by arrow b to cause both the bearing support 3 and the bearing 4 to be deformed, as shown in FIG. 1 (B).

The pressing force exerting on the bearing support 3 can be adjusted by changing the revolution of the screw shaft of the drive unit for moving the movable pressing roller 6-3 while pressing in the direction shown by arrow a, or changing the pressure of a hydraulic unit used instead of the screw shaft.

The bearing device of the miniature motor manufactured according to the abovementioned manufacturing method is shown in FIG. 3. The clearance G between the bearing 4 and the motor shaft 5 in the bearing device is made smaller than the clearance G (as shown in FIG 1(A)) before the pressing process. The bearing device according to this invention has a pressed groove 7 formed on the outer circumferential surface of the bearing support 3 as a result of the pressing force exerted by the fixed pressing rollers 6-1 and 6-2 and the movable pressing rollers 6-3 are forced onto the outer circumferential surface.

In the foregoing, the bearing device for miniature motors and the method of making the same according to this invention have been described. Now, the results of comparison between the conventional miniature motor and the miniature motor of this invention are shown in the following table. The data shown in the table are average values for ten units of miniature motors, and mechanical noise values given in the table are those measured using a resonance box.

TABLE

|  | Conventional motor | Motor of this invention | Difference |
| --- | --- | --- | --- |
| ID of bearing (mm) | 2.006 | 2.003 | −0.003 |
| revolution (rpm) | 7543.7 | 7352.4 | −191.3 |
| Current (mA) | 218.0 | 232.5 | +14.5 |
| Mechanical noise (dB) | 73.8 | 70.3 | −3.5 |

As is evident from the above table, this invention makes it possible to reduce the clearance between the bearing and the motor shaft in a miniature motor, thereby reducing mechanical vibration and mechanical noise.

What is claimed is:

1. A bearing device for miniature motors having a cylindrically-shaped bearing support formed on an end face of a metallic motor case, and a bearing press-fitted to said bearing support for rotatably supporting a motor shaft, is that a pressed groove is formed on the outer circumferential surface of said bearing support by pressing said outer circumferential surface.

2. A bearing device for miniature motors as set forth in claim 1 wherein said pressed groove is a narrower groove than the width of said bearing support.

3. A bearing device for miniature motors as set forth in claim 1 wherein said pressed groove is a wider groove than the width of said bearing support.

* * * * *